DROP CHANNEL PULSE MULTIPLEX SYSTEM

Filed Jan. 26, 1944 7 Sheets-Sheet 1

INVENTOR.
DONALD D. GRIEG
BY
R. P. Morris
ATTORNEY

April 3, 1951 D. D. GRIEG 2,547,001

DROP CHANNEL PULSE MULTIPLEX SYSTEM

Filed Jan. 26, 1944 7 Sheets-Sheet 2

INVENTOR.
DONALD D. GRIEG

BY R. P. Morris

ATTORNEY

April 3, 1951 D. D. GRIEG 2,547,001

DROP CHANNEL PULSE MULTIPLEX SYSTEM

Filed Jan. 26, 1944 7 Sheets-Sheet 3

INVENTOR.
DONALD D. GRIEG

BY

R. P. Morris
ATTORNEY

April 3, 1951 D. D. GRIEG 2,547,001

DROP CHANNEL PULSE MULTIPLEX SYSTEM

Filed Jan. 26, 1944 7 Sheets-Sheet 4

INVENTOR.
DONALD D. GRIEG

BY

R. P. Morris
ATTORNEY

April 3, 1951 D. D. GRIEG 2,547,001

DROP CHANNEL PULSE MULTIPLEX SYSTEM

Filed Jan. 26, 1944 7 Sheets-Sheet 5

INVENTOR.
DONALD D. GRIEG

BY

[signature]
ATTORNEY

April 3, 1951 D. D. GRIEG 2,547,001

DROP CHANNEL PULSE MULTIPLEX SYSTEM

Filed Jan. 26, 1944 7 Sheets-Sheet 6

INVENTOR.
DONALD D. GRIEG

BY

R. P. Morris
ATTORNEY

DROP CHANNEL PULSE MULTIPLEX SYSTEM

Filed Jan. 26, 1944 7 Sheets-Sheet 7

INVENTOR.
DONALD D. GRIEG

BY

R. P. Morris
ATTORNEY

Patented Apr. 3, 1951

2,547,001

UNITED STATES PATENT OFFICE 2,547,001

DROP CHANNEL PULSE MULTIPLEX SYSTEM

Donald D. Grieg, Forest Hills, N. Y., assignor to Federal Telephone and Radio Corporation, New York, N. Y., a corporation of Delaware Application January 26, 1944, Serial No. 519,757

12 Claims. (Cl. 179—15)

This invention relates to communication systems and more particularly to communication systems provided with means for dropping or replacing one or more channels at a branch station intermediate the principal terminals of the system.

Systems for multiplex communication by means of interleaved, timed, trains of impulses have heretofore been proposed. In these systems, generally the segregation of the channels is accomplished by timing selector means rather than by using filters, as in the case of multiple carrier multiplex systems. In such pulse multiplex systems, it has been proposed to provide branch circuits for selecting one or more of the channels at different branch points. However, in these proposed systems, the pulses defining channels selected at the branch circuit continue through the line to the principal receiving terminal. As a consequence, it has not been readily possible with these proposed systems to communicate between the branch terminal and both of the principal terminals without waste channel space.

It is an object of the present invention to provide a multiplex pulse transmission system in which one or more channels carried by a common transmission medium may be selected at an intermediate terminal and the selected channel or channels may be suppressed in the common transmission medium so that the pulses do not continue to the ultimate terminal and, where desired, to replace the suppressed pulses with other signal modulated pulses at the branch terminal.

It is a further object of my invention to provide, at a branch terminal in a multiplex pulse transmission system in which the several channels are defined by a resultant pulse train in a common medium, a transmitter arrangement for supplying pulses defining a communication channel timed with respect to the pulses in the multiplex system so that they will fit into gaps or spaces in the resultant train in the common medium of transmission.

It is a still further object of my invention to provide a branch terminal in a multiplex pulse communication system in which channels to be selected at the branch terminal may be controlled by synchronizing energy applied to the pulses at the transmitting end.

It is a still further object of my invention to provide a multiplex pulse communication system wherein communication may be had between the principal terminals of the system, between a principal terminal of the system and one or more branch terminals and between one of the branch terminals and another of the branch terminals.

According to a feature of my invention, a plurality of trains of pulses having a given cadence frequency are applied to a common medium at a first terminal for connection over the common medium to a second terminal. Coupled to the common medium, intermediate the first and second terminals, are provided one or more branch terminals. The branch terminals may be provided with means for selecting one or more of the channels, means for suppressing the selected channels in the common medium and means for inserting a new series of pulses timed to occupy the spaces left by suppression of the pulses in the common medium. The branch terminals may be arranged so that successive branch terminals will select differently timed channels or channels of the same timing so that communication may be had among the various terminals, as desired.

According to a further feature of my invention, the pulses of each channel may be supplied with signal modulations modulating the pulses, either in time position, amplitude, width or the like. In addition, at one of the teminals, means may be provided for applying a synchronizing modulation to the pulses of a channel to be selected and selective means may be provided in the branch terminal responsive to the synchronizing signal for selecting from the common medium the desired channels.

A better understanding of my invention and the objects and features thereof may be had from the particular description of an embodiment and certain modifications thereof, made by reference to the accompanying drawing, in which.

Figure 3:
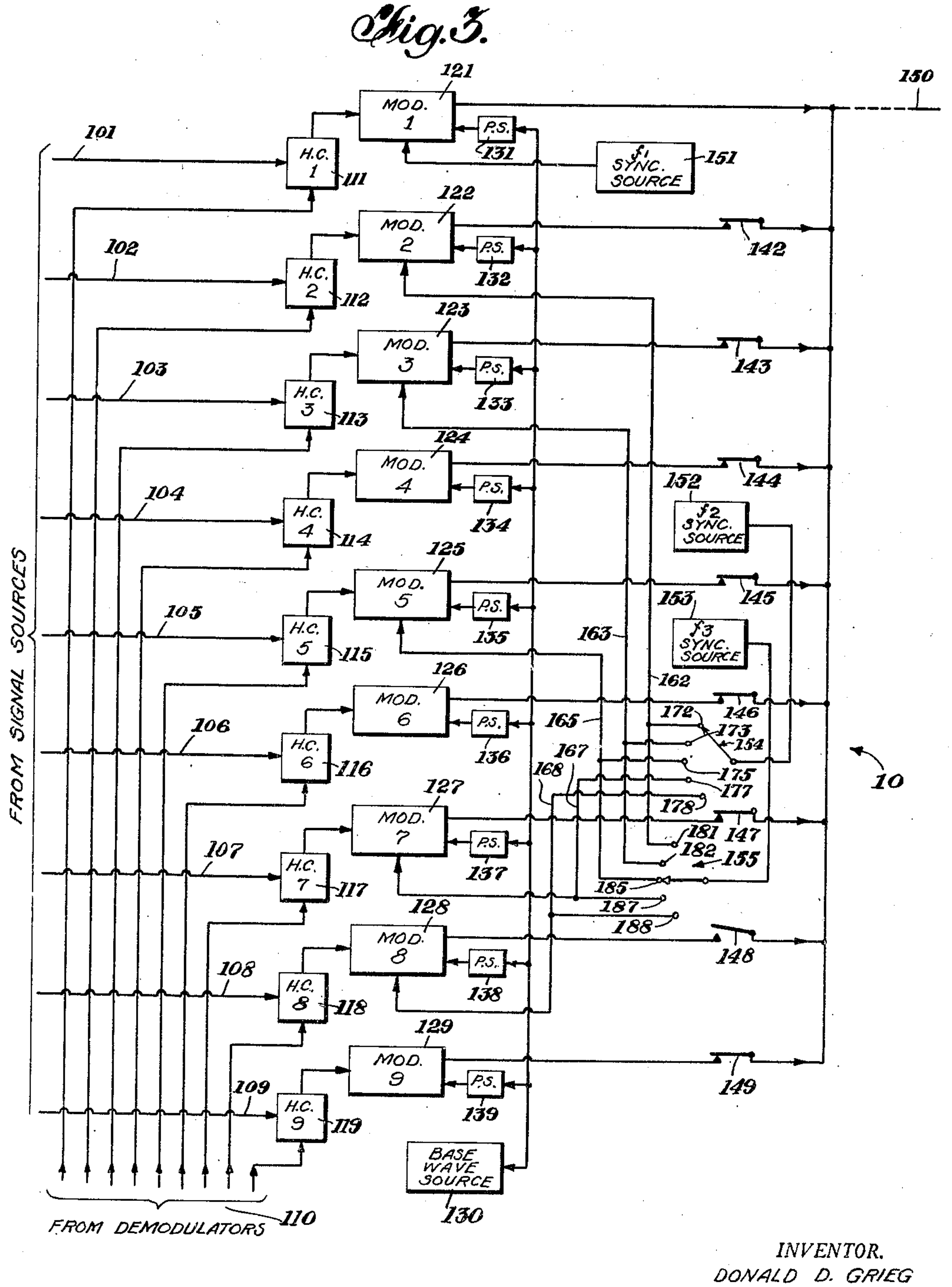
Figure 4:
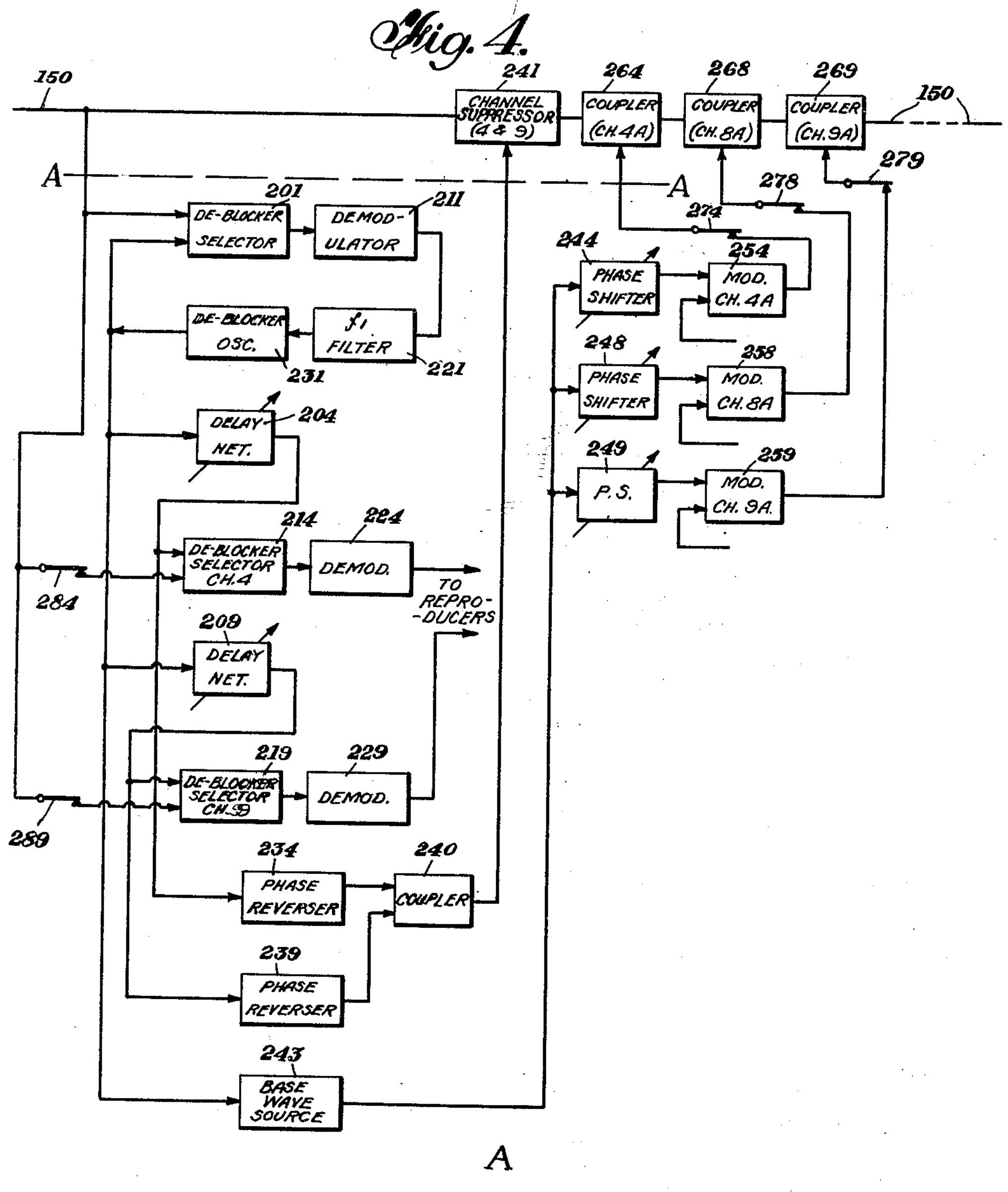
Figure 5:
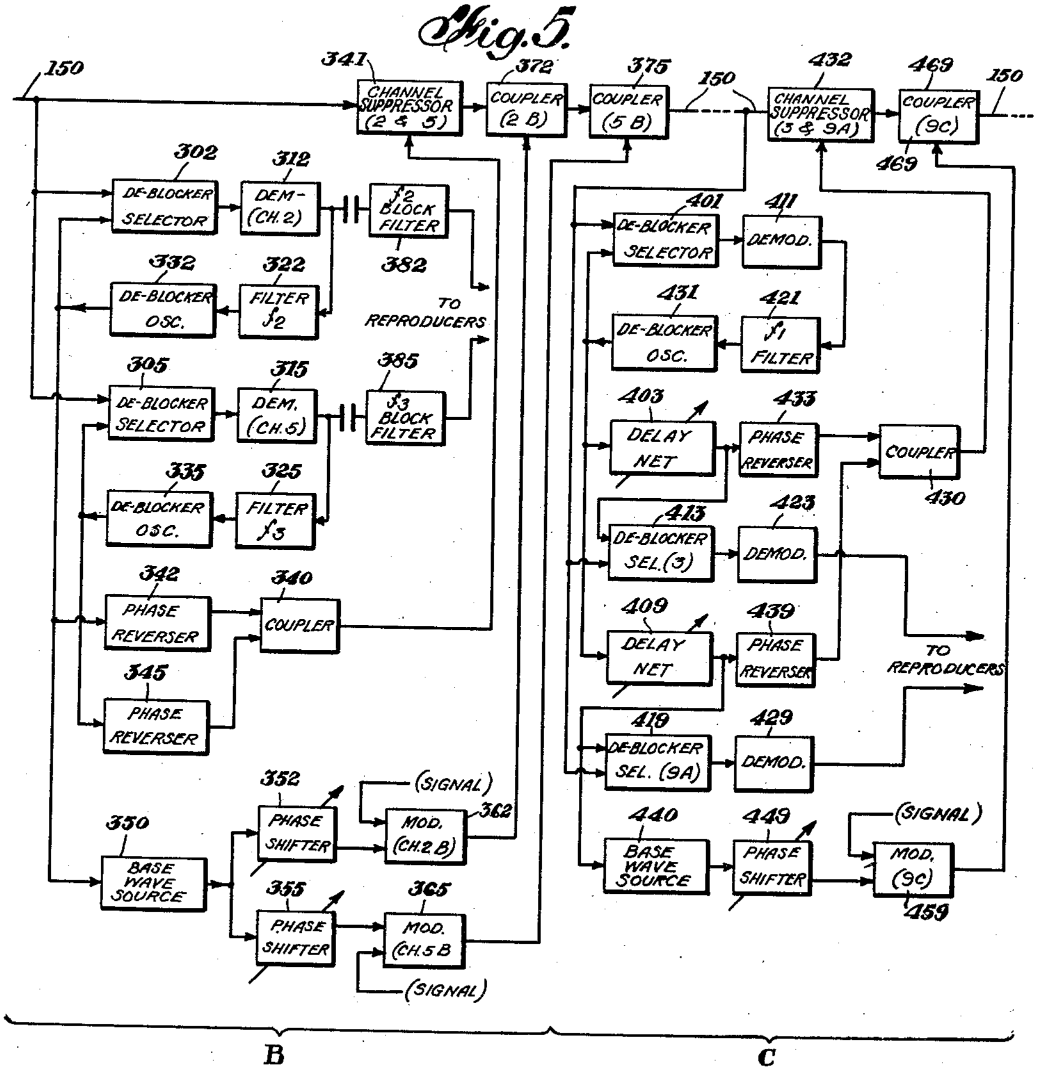
Figure 6:
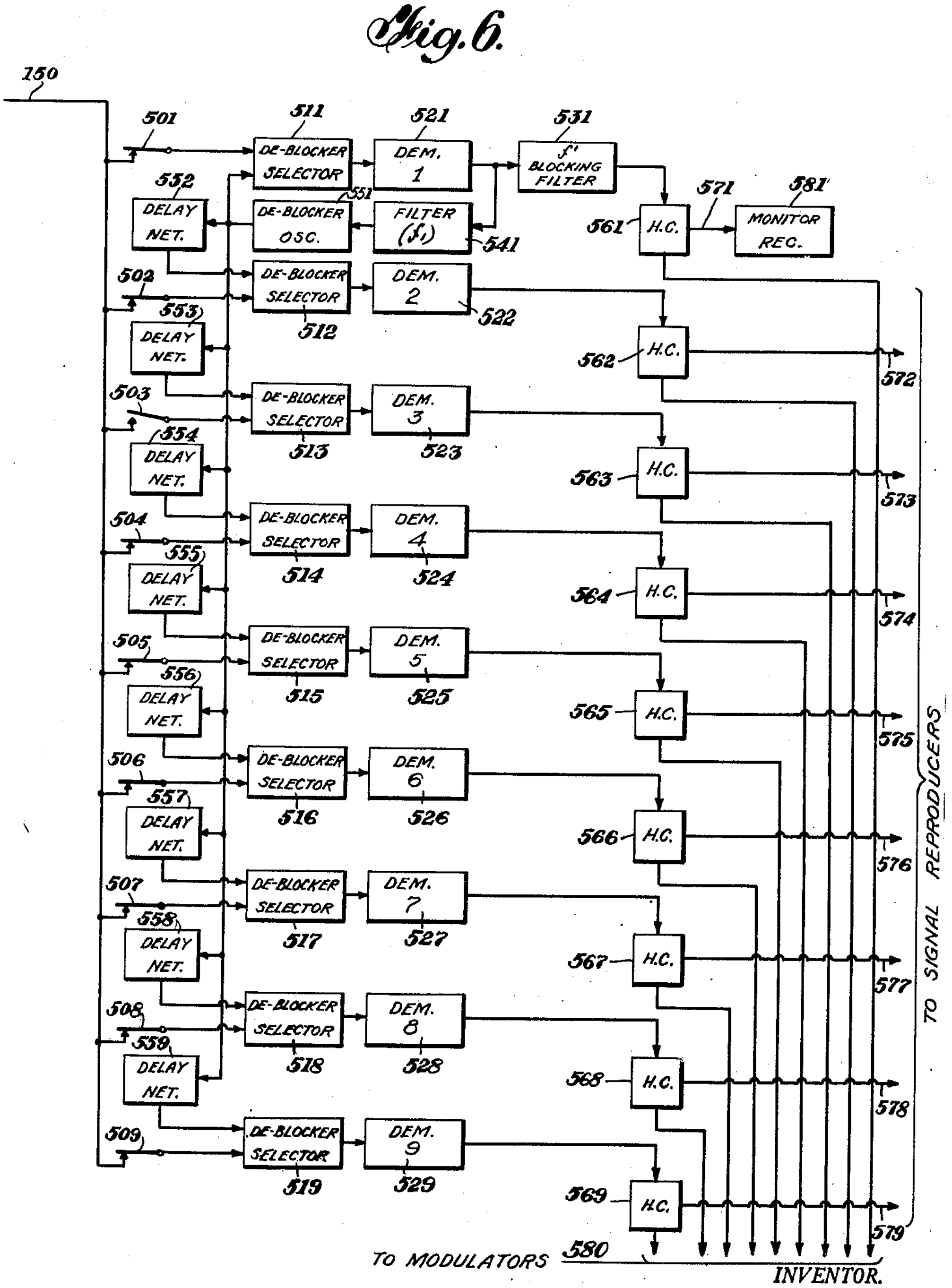
Figure 7:
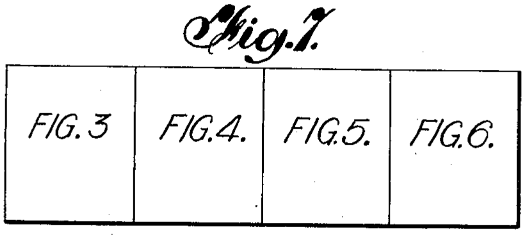
Figure 8:
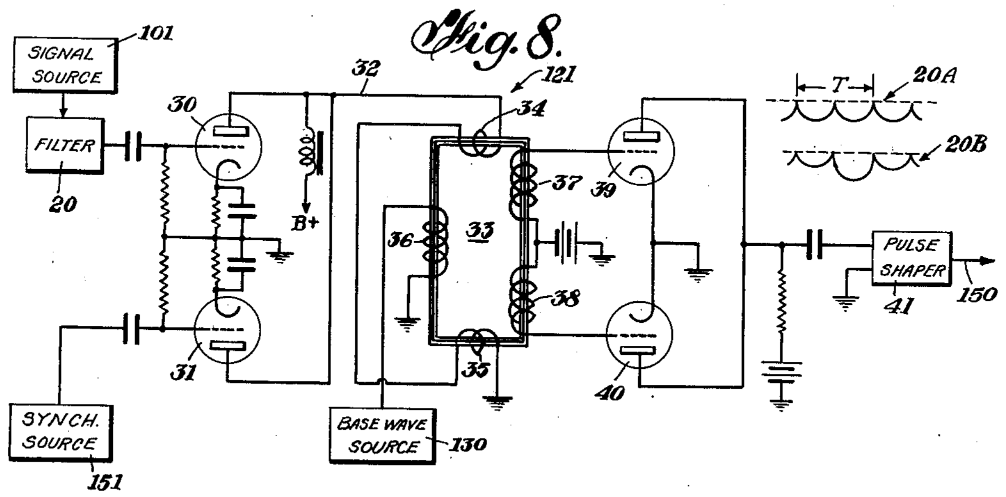
Figure 9:
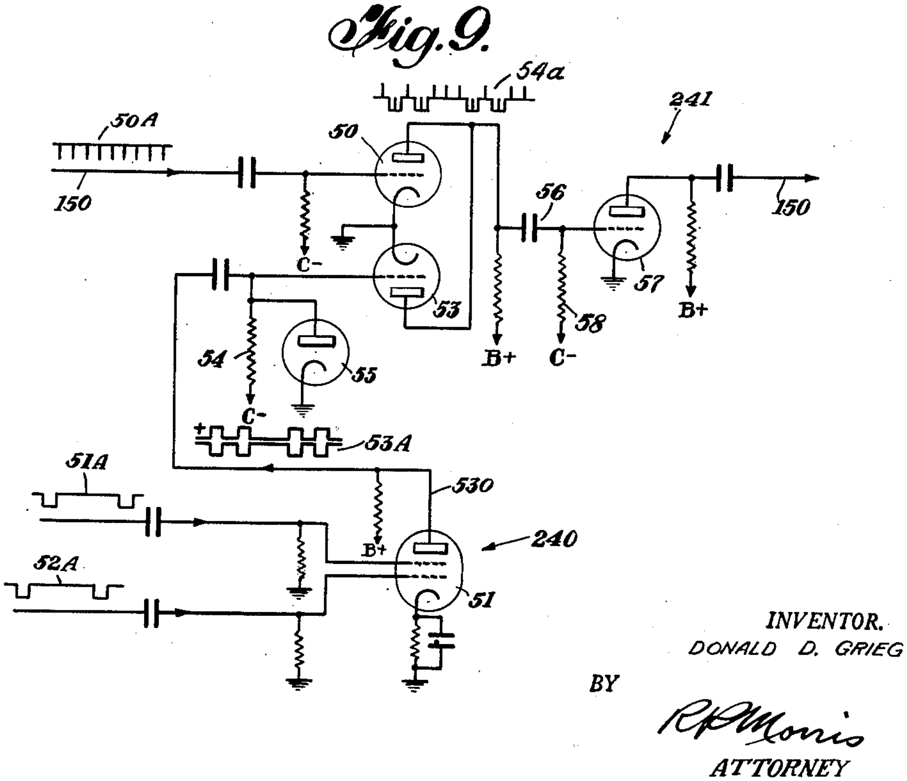
Figure 10:
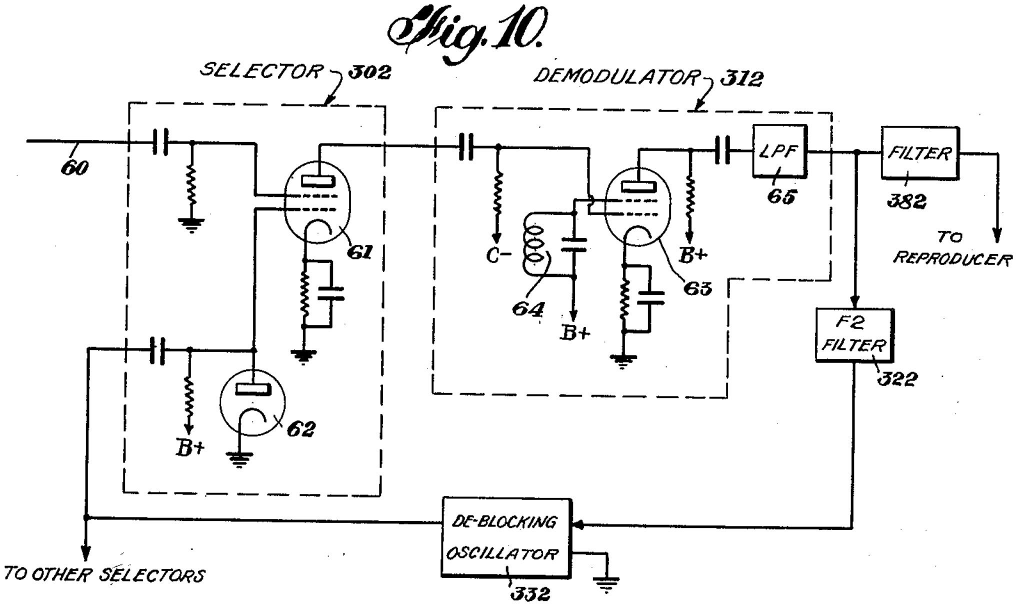
Figure 11:
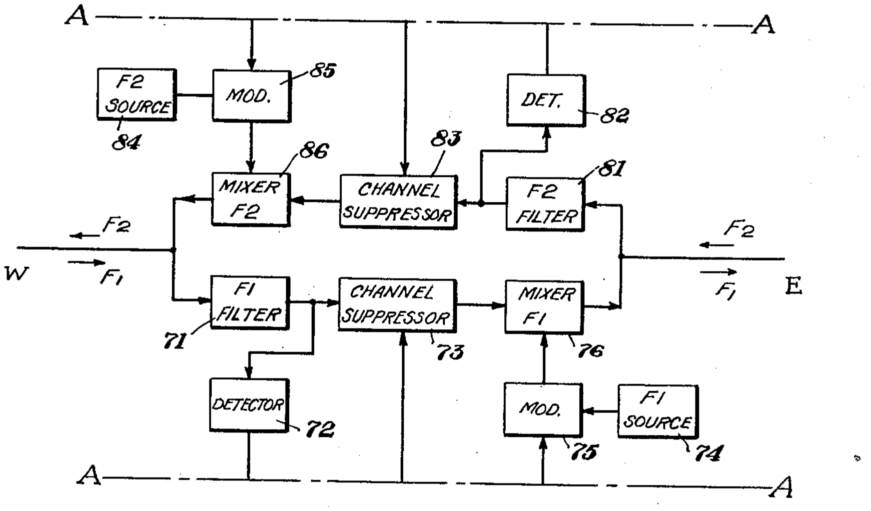

Figs. 3 to 6 inclusive, taken together and arranged in accordance with the showing of Fig. 7, illustrate in block diagram a circuit arrangement in accordance with my invention, Fig. 3 showing a principal or west terminal station, Fig. 4 a branch terminal A, Fig. 5 branch terminals B and C and Fig. 6 the other principal or east terminal of the system;

Fig. 8 is a wiring diagram of a time modulator which may be used as a part of the circuit in accordance with my invention;

Fig. 9 is a diagram of a mixer tube and channel suppressor circuit which may be used in accordance with my invention;

Fig. 10 is a wiring diagram of a selector and demodulation station, in accordance with my invention; and Fig. 11 is a block diagram illustrating the application of the principles of my invention to a carrier frequency transmission system.

Figure 1:
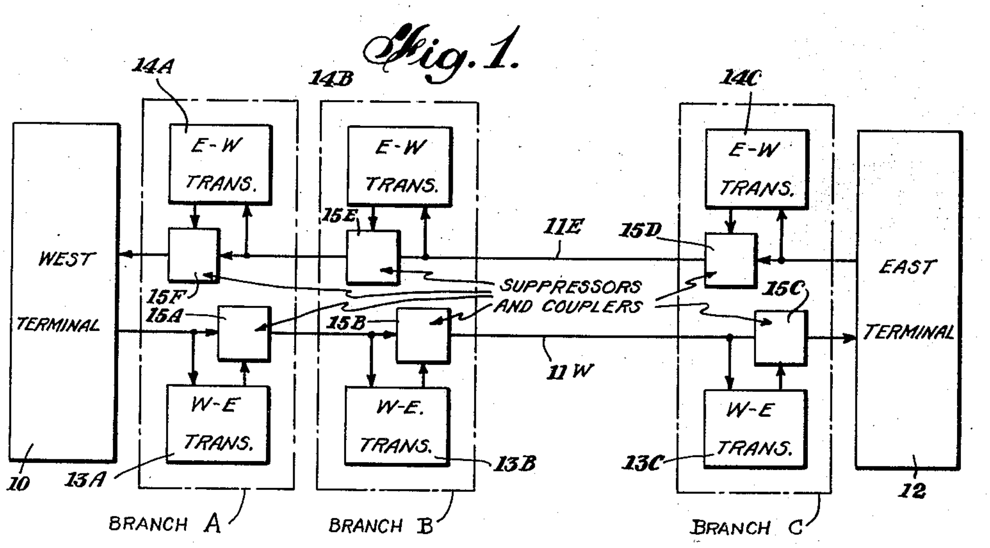
Fig. 1 is a simplified block diagram of a communication system incorporating the features of my invention.

Turning first to Fig. 1, 10 shows a west terminal coupled over transmission lines 11W, 11E to east terminal 12. Intermediate terminals 10 and 12 are provided branch terminals A, B and C. At branch terminal A is provided a west-east translator circuit 13A and a pulse suppressor and coupler circuit 15A together with an east-west translator 14A and a suppressor and coupling unit 15F. Similar west-east translators and suppressor and coupler circuits 13B, 14B, 15B, 15E and 13C, 14C, 15C and 15D are shown, respectively, at branch terminals B and C.

It is understood that terminal 10 is a multiplex transmitter arrangement which may supply a large number of channels. For simplicity of explanation, however, the circuit arrangement, as illustrated in more detail in Figs. 3 to 6, inclusive, shows only nine channels numbered 1 to 9, inclusive.

Figure 2:
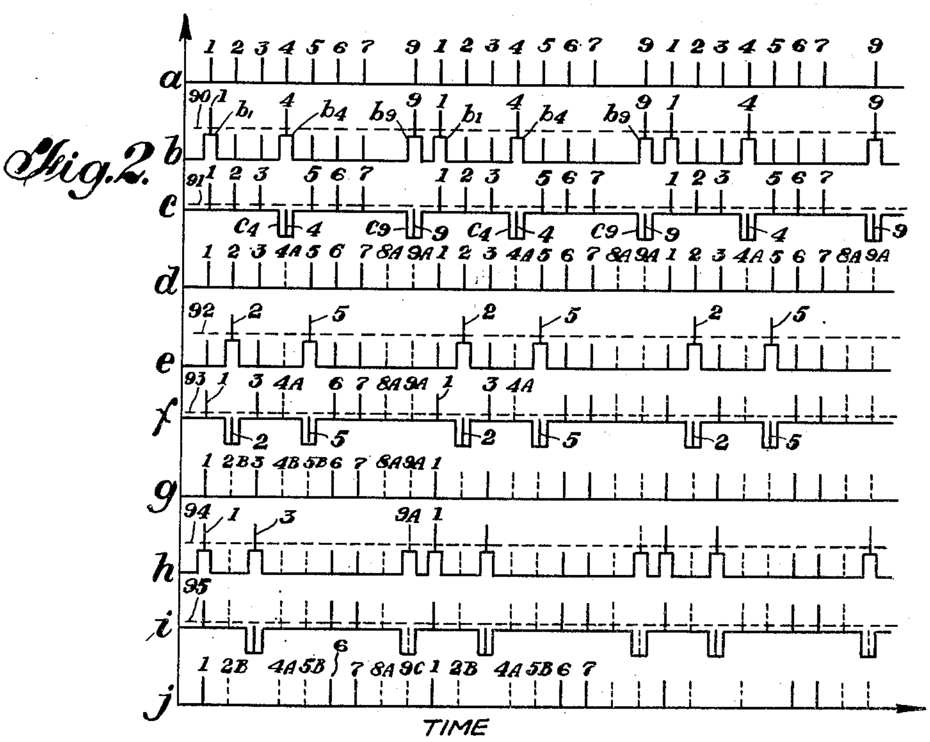
Fig. 2 is a set of curves illustrating the operation at various branch terminals in accordance with my invention.

Referring to Fig. 2, curve *a* illustrates the channels which may be transmitted from terminal 10. It will be noted that in this curve channel 8 has been omitted. This channel may be supplied at a subsequent branch terminal as will be explained below. At branch terminal A selection of channels 1, 4 and 9 is made, see curve *b*. Channel 1, however, is used only as a synchronizing channel and is not suppressed at this terminal. However, channels 4 and 9 are suppressed, as shown at curve *c*. Other channels 4A and 9A, as well as a channel to fill in the blank of 8, numbered 8A, are supplied at this branch terminal so that the output will be substantially in accordance with the illustration of curve *d*. At branch terminal B channels 2 and 5 are selected. These selected channels are also suppressed at this branch terminal and new channels 2B and 5B are substituted in their stead, as can be seen from curves *e*, *f* and *g*. At branch terminal C, channels 1, 3 and 9A are selected. At this branch terminal a further channel 9C is reinserted but the space for channel 3 is left blank. This can be seen in curves *h*, *i* and *j*. As a consequence, the east terminal 12 receives the remaining channels 1, 6 and 7 which come directly from terminal 10, channels 4A and 8A directly from branch terminal A, channels 2B and 5B directly from branch terminal B and channel 9C from branch terminal C. At the same time, intercommunication between branch A and branch C is carried on by means of channel 9A.

The above explanation briefly traced only the communication in the west-east dircetion. It is, of course, udnerstood that a similar transmission between terminals 12 and 10 and the various branch terminals may be carried on in the east-west direction.

Turning now to Figs. 3 to 6, inclusive, a more complete description of the operation of the system may be had. In Fig. 3 is shown a first terminal 10 which may comprise incoming signal lines 101 to 109, inclusive, coupled through hybrid coils 111 to 119, inclusive, to modulators 121 to 129, inclusive. These modulators may be of any desired type but are preferably of the type producing time displacement modulation of pulses. In order to effect this time modulation, energy from a base wave source 130 is applied over individual phase shifters 131 to 139, inclusive, to the respective modulator circuits 121 to 129. The phase shifters are adjusted so that the individual trains of pulses for the separate channels will be displaced in time to provide a single resultant train in the common output. In addition, the lines 110 from demodulator circuits, not shown, are coupled to hybrid coils 111 to 119 and to lines 101 to 109 for communication in the opposite direction. This will serve for normal two way communication over lines 101—109, the hybrid coils preventing energy received from the demodulators from feeding into the modulator circuits.

Channel 1 may be used as a synchronizing channel and to this end a synchronizing source 151 supplying energy at frequency *f1* is coupled to modulator 121. In the output of the other modulators 122 to 129 are provided switches 142 to 149, inclusive, so that if any of these channels is not being used for communication the switches may be opened so that pulses corresponding to this channel will not be applied to the line. As illustrated, switch 148 is opened so that no pulses corresponding to channel 8 are applied to the transmission line 150. In addition, two other synchronizing sources 152 and 153 supplying energy at *f2* and *f3* are provided. Source 152 is provided with an adjustable switch 154 and source 153 with an adjustable switch 155 for selectively applying these synchronizing signals to modulators 122, 123, 125, 127 or 128, as desired. It should be clear that other contacts may be provided so the synchronizing signals may be applied to any of the channels, if desired. In the position shown, energy from 152 is supplied to modulator 122 and energy from 153 is supplied to modulator 125 providing a special synchronizing or selector modulation to each of channels 2 and 5. Phase shifters 131 to 139, inclusive, are so adjusted that the pulse outputs from 121 to 129, inclusive, will be applied to the transmission line 150 in timed spaced relationship providing a resultant train of waves corresponding to curve *a* of Fig. 2.

In Fig. 4 is shown the west-east selector system for branch terminal A. The pulses incoming over line 150 are applied to the de-blocker-selector 201 and from this selector to demodulator 211. The output from demodulator 211 is supplied over filter 221 to de-blocking oscillator 231 which serves to produce timed pulses, preferably of substantially rectangular form, for application to the de-blocker selector circuit.

Preferably, the de-blocker oscillator 231 is normally timed to provide a pulse spacing slightly greater than the interval spacing of the pulses of any one channel. As a consequence, when the pulses arrive at de-blocker 201 they are selected in rotation until such time as channel 1 is received. Upon receipt of channel 1, however, demodulator 211 produces an output tone corresponding to frequency *f1* applied from source 151 to the modulator 121. This tone frequency *f1* is selected by filter 221 and serves to synchronize de-blocking oscillator 231 with the interval timing of the pulse channels. As a consequence, the progression of selections is halted and the selected channels are continuously received thereafter. An understanding of the details of this particular selector arrangement is not necessary to a complete understanding of my invention and is therefore not set forth in detail herein although further explanation is given later in connection with Fig. 10. For a more complete understanding of this feature, reference may be had to my copending application, entitled "Multiplex Synchronizing System," Serial No. 514,998, filed December 20, 1943, now Patent No. 2,418,116, granted April 1, 1947.

At station A in Fig. 4, energy from de-blocking oscillator 231 is also applied over delay networks 204 and 209 to other de-blocker selectors 214 and 219. Also, the pulses from line 150 are applied to these de-blocker selectors so that corresponding channels may be selected. In the present description, for purposes of illustration, it is assumed that delay networks 204 and 209 are adjusted to select channels 4 and 9, respectively. These selected channels are then demodulated in demodulators 224 and 229 and applied to suitable reproducers, not shown. The selectors 201, 214 and 219 serve to select pulses 1, 4 and 9 by selector pulses $b1$, $b4$ and $b9$, shown compositely in curve $b$, Fig. 2. The selectors also serve to clip the composite pulses at clipping level 90 so that only pulses 1, 4 and 9 remain.

The de-blocking oscillations from delay networks 204, 209 are further conducted to phase reversers 234 and 239, respectively, providing suitable reversed wave forms $c4$ and $c9$ with the same timing as the selector pulses $b4$ and $b9$. These sets of pulses may be combined in a coupler mixer 240 and applied to channel suppressor 241. In suppressor 241 the phase reversed de-blocking oscillator pulses and the channel pulses are combined, as shown at curve $c$ of Fig. 2, suppressing channels 4 and 9 from the common medium. These suppressed channels leave gaps in the pulses applied to the common medium, as shown by the pulses of clipping level 91 of the suppressor.

Energy from de-blocking oscillator 231 may be further applied to a base wave source 243 operating at substantially the same frequency as base wave source 130 of Fig. 3. The de-blocking oscillator pulses serve to synchronize base wave source with the incoming pulses or may serve directly to generate waves of this base frequency synchronized with the incoming selected pulses. Energy from the base wave source 243 is applied over phase shifters 244, 248 and 249 to modulators 254, 258 and 259 serving to produce channels 4A, 8A and 9A corresponding to channels 4, 8 and 9. Phase shifters 244, 248 and 249 are adjusted so that the produced pulses of channels 4A, 8A and 9A will properly sandwich in to the corresponding gaps in the common medium. These pulses are then applied to line 150 through coupling circuits 264, 268 and 269, producing in the line a resultant train of pulses, as shown at $d$, Fig. 2. Coupling circuits 264, 268 and 269 may not be necessary. However, it is preferable to have these circuits to prevent pulses from lines 150 feeding down to the separate modulators. In the absence of proper matching they might reflect from the modulators causing interference in the transmission line. Switches 274, 278 and 279 are provided to disconnect modulators 254, 258 and 259 from line 150 in case communication on these channels is not desired at this point. Similarly, switches 284 and 289 may be provided to disconnect the de-blocker-selector channels 214 and 219 from the line in case no communication is desired at station A.

The incoming pulses from line 150, in accordance with curve $d$ are transmitted from station A to branch station B, shown in Fig. 5. The station B selection of the channels to be dropped is made through the medium of the signals $f2$ and $f3$ from sources 152 and 153 of Fig. 3. In the position indicated, channels 2 and 5 are selected. These pulses are applied over de-blocker-selector circuits 302, 305 to demodulators 312, 315, respectively. The synchronizing signals from demodulators 312 and 315 are applied over filters 322 and 325 to de-blocking oscillators 332, 335, respectively, to cause automatic selection of these channels in the same manner that channel 1 was selected at branch station A. The output from demodulators 312 and 315 are applied over filters 382 and 385 to suitable reproducers. The filters 382 and 385 serve to remove from the signalling energy the synchronizing frequency $f2$ and $f3$ so that they will not be present in the reproducers. The selection of these channels at station B is shown at curve $e$, Fig. 2, in which the pulses are clipped at clipping level 92.

The pulses from the de-blocking oscillators 332 and 335 are applied over phase reversers 342 and 345 to coupler 340 which serves to combine the reversed pulses and these reversed pulses are applied to channel suppressor 341 together with the incoming pulses from line 150 producing a resultant curve corresponding to $f$, Fig. 2, clipped at clipping level 93. The output from de-blocking oscillator 332 is applied to a base wave source 350 which furnishes a modulating base wave over phase shifters 352, 355 to signal modulators 362, 365, respectively. These modulators produce other channels 2B, 5B corresponding to the suppressed channels 2 and 5 which channels are applied over couplers 372, 375 to line 150 producing the resultant wave train in line 150, shown at $g$, Fig. 2.

This resultant train is applied at branch station C to de-blocker selectors 401, 413 and 419 serving to select channels 1, 3 and 9A, respectively. As in the case of branch A, channel 1 serves merely for synchronizing in this case. Accordingly, the signals for de-blocker 401 are applied to demodulator 411 and a filter 421 in the output of this demodulator serves to select the synchronizing frequency $f1$ from the signal synchronizing de-blocking oscillator 431 with the incoming pulses. Energy from de-blocking oscillator 431 is applied to de-blocking selectors 413 and 419 over delay networks 403 and 409 adjusted properly to select the channels. The outputs from selectors 413 and 419 are applied to demodulators 423 and 429, respectively, and from there to suitable reproducers, not shown. This selecting operation serves to select channels 1, 3 and 9A, as shown at curve $h$, Fig. 2, clipped at the clipping level 94.

The de-blocking oscillations from the output of delay networks 403 and 409 are reversed in phase reversers 433 and 439 and combined in coupler 430 for application to channel suppressor 432 producing the resultant wave, shown at curve $i$, Fig. 2, clipped at level 95.

From the output of delay network 409 is supplied a synchronizing connection base wave source 440, which, over phase shifter 449, serves to produce the desired modulating wave for modulator 459 producing in the output a channel 9C. This channel 9C is coupled to line 150 over coupler 469 producing in line 150 the resultant pulse train shown at curve $j$ of Fig. 2. It should be noted that in this curve channel 3 was not reinserted so that a gap corresponding to this channel appears in the resultant pulse train.

The pulses from line 150 continue to east terminal 12, shown in Fig. 6. In this terminal the pulses from the line may be applied to the several de-blocking selectors 511 to 519, respectively, over switches 501 to 509. As shown, there is no incoming signal corresponding to channel 3 so switch 503 remains open and the channel selector 513 is therefore ineffective. The incoming pulses from channel 1 are applied over de-blocking selector 511 to demodulator 521, the synchronizing frequency $f1$ is selected at filter 541 and applied to de-blocking oscillator 551 to synchronize this oscillator with the incoming signals, as explained above. Since channel 1 preferably serves as a monitoring channel the output from demodulator 521 is supplied also over filter 531, which serves to block out synchronizing frequency $f1$, and over a hybrid coil 561 and a line 571 to the monitoring receiver 581.

Pulses from de-blocking oscillator 551 are also applied over delay networks 552 to 559, respectively, to de-blocker selectors 512 to 519 in the outputs of which are coupled demodulators 522 to 529 which serve to demodulate the signals incoming over the several channels. The demodulators are coupled over hybrid coils 562 to 569, respectively, and lines 572 to 579, respectively, to their respective signal reproducers. The other terminals of the hybrid coils 561 to 569, inclusive, may be coupled over the separate lines 580 to modulators which, in conjunction with the reproducers connected to lines 572 to 579, will afford two way audio communication.

It will be readily appreciated that the system disclosed herein is merely illustrative of a multiplex system incorporating the principles of my invention and that other branch terminals may be provided, as desired. Furthermore, any known type of transmission and selection circuit may be used in place of the specific types illustrated without departing from the scope of my invention.

In order more clearly to disclose the structural examples of a transmitter in accordance with my invention, reference may be had to the circuit diagram of Fig. 8. In this figure, energy from a signal source indicated in Fig. 3 as connected to line 101 is applied over a filter 20 to modulating circuit 121, the output of which is coupled to the outgoing line 150. Incoming signal frequencies are applied over filter 20, which is tuned to exclude the synchronizing frequencies, to a tube 30. Simultaneously, synchronizing modulations from source 151 are applied to another tube 31. The outputs of these tubes are combined in line 32 producing a resultant mixing of the signals and synchronizing frequencies. This resultant mixed wave is applied over separate transformer windings 34 and 35 to a mixing transformer arrangement 33. Simultaneously, energy from a base wave source 130 is applied to mixing transformer 33 by means of coil 36. Secondary coils 37 and 38 are also coupled to 33 to extract from there the mixed signals. Coils 37 and 38 are coupled to a pair of triode rectifiers 39 and 40 symmetrically biased. The base wave source 130 preferably has a frequency corresponding to the desired cadence frequency T of the pulses to be produced.

Since tubes 39 and 40 constitute a full wave rectifier, an output wave of the form shown at 20A will be produced in the absence of any input signals from sources 101 or 151. This wave is applied to a pulse shaper 41 producing a plurality of symmetrically spaced pulses having cadence frequency of T. Upon application of energy from sources 101 and 151 the symmetry of the rectifier circuit 39, 40 is upset producing pulses having substantially the same cadence frequency as before but at an unsymmetrical repetition rate, as shown in curve 20B. Thus, as the signals are applied to modulate the base wave energy a time displacement of the pulses in the output of pulse shaper 41 is provided. While Fig. 8 discloses a transmitter circuit such as shown at 121 of Fig. 3, it is clear that the same type of transmitter may be used in all of the different circuits. However, in systems in which no synchronizing signals are to be applied, source 151 may be omitted. Furthermore, a phase shifter, for the base wave source energy applied to the separate modulators, is preferably provided in order to secure the desired time spacing of the pulses to produce the resultant sandwiching or interleaving of the pulse channels on line 150.

In Fig. 9 is illustrated the coupler and mixer circuits corresponding to 240 and 241 of Fig. 4. The mixer circuit 240 comprises a tube 51 into which the inverted de-blocking oscillations phase displaced with respect to one another, as shown at 51A, 52A, are fed. These pulses are fed to separate grids in tube 51 so that each of them independently produces an output impulse in line 530 providing a resultant curve such as shown at 53A. The suppressor circuit 241 comprises a pair of mixing tubes 50, 53. Into tube 50 is fed the incoming pulse train from line 150, as shown at 50A, while the wave 53A is fed into tube 53. The two plate circuits of tube 50, 53 are connected in parallel producing a resultant output wave shown at 54A. This resultant wave is fed over coupling condenser 56 to clipper tube 57. A sufficient bias is applied to the grid of tube 57 over resistor 58 so that only the peak boosted pulses are repeated, applying to line 150 at the output of tube 57 a series of pulses. At the input of tube 53 is provided the usual grid resistance 54 shunted by a rectifier 55. This rectifier 55 is usually known as a D. C. restorer and serves to assure that the amplitude of pulses from 53A are at all times of the same value. By having this value fixed, the clipping action of tube 57 may be properly adjusted to only clip so much of wave 54A as is necessary to produce the desired resultant output pulses.

It is clear that other couplers in line 150, such as shown at 372, 375, etc., may be of similar form to the coupler 240. These couplers serve merely to prevent the pulses transmitted over line 150 from being fed back to the modulators 362, 265, just as above explained when discussing couplers 264 to 269. In place of this type of vacuum tube coupler, suitable bridge or hybrid coil arrangements may be used in some instances.

A typical demodulator circuit is shown in Fig. 10. This circuit corresponds to the selector demodulator arrangement 302, 312 of Fig. 5. It should be distinctly understood, however, that the same type of circuit may be used for demodulation in the other parts of the system. According to this arrangement, the train of pulses from line 150 is fed over line 60 to mixer tube 61. At the same time, de-blocking pulses from de-blocker oscillator 332 are fed to another separate grid of tube 61. These de-blocking pulses serve, in conjunction with the incoming pulses timed to add thereto, to produce an output series of pulses in tube 61. Thus, for example, as shown in curve $e$ of Fig. 2, the de-blocking oscillator may serve to produce a plurality of rectangular pulses timed in spaced relation with the pulses 2 and 5. Tube 61 is also biased to serve as a clipper so that only the boosted pulses 2, 5 appear in the output thereof. A D. C. restorer rectifier tube 62 may be provided across the input from de-blocking oscillator 332 to assure that the incoming de-blocking pulses are of a proper level to work with the clipper circuit of 61 to leave only the desired output pulses.

The output pulses from 61 are spaced with the same repetition frequency and have the same cadence frequency as the original modulated pulses from a modulator, such as shown in Fig. 8. The pulses are applied to one of the grids of a de-modulator tube 63 and cause tuned circuit 64 connected to the other grid of this tube to oscillate at a desired frequency producing in the output of tube 63 a combined wave in the form of a combination of the wave generated in 64 and the incoming pulses. Circuit 64 is preferably tuned to some harmonic of the cadence frequency of the input pulses so that as the repetition rate is varied, due to the modulation signals, the output pulses will be raised to different levels depending upon the spacing. Accordingly, in the output of tube 63 will appear a modulation envelope of pulses carrying signal modulations thereon. A low pass filter 65 is provided to remove from this demodulated signal envelope the pulses of higher frequencies that define the signal envelope. The output synchronizing signal is passed over filter 322 tuned to pass only the synchronizing frequency $f2$ which, in turn, serves to synchronize the operation of de-blocking oscillator 332. The remaining demodulated waves are passed over a filter 382 tuned to exclude the synchronizing signal to a suitable reproducing device. It should be distinctly understood that in cases where the deblocking oscillator is not controlled directly by the output waves, the de-blocking pulses applied to tube 61 may come from a suitable delay line dependent upon the channel to be selected.

In the circuits described so far, it has been assumed that the modulated pulses are being transmitted at their normal frequency so that separate lines are required for the west-east and east-west transmission. The signal pulses, however, may be used to modulate higher frequency carriers and a single transmission line used as a transmitting medium between the various terminal stations. Such a circuit arrangement is shown in Fig. 11. The west-east transmission takes place at carrier frequency F1 while the east-west transmission takes place at a different frequency F2. At any branch terminal, for example, a terminal corresponding to that shown in Fig. 4, F1, F2 may be separated by suitable input filters 71 and 81. The filtered signals may be detected at 72, 82, respectively, and applied to the deblocker demodulator circuits, such as shown below the line A—A of Fig. 4.

The combined suppression signals may be applied to the respective channel suppressors 73, 83, serving to bias an amplifier tube, for example, to cut off so as to suppress the pulses corresponding to the desired suppressed channels. The remaining pulses from 73, 83 are passed on to the mixers or couplers 76, 86 and from there to the transmission line. The channels to be inserted after suitable modulation and phase shifting are applied to modulators 75, 85, respectively, together with carrier frequency energy of F1 and F2 from sources 74 and 84. These pulses produced in modulators 75, 85 are then also applied to mixers 76, 86 in the proper timed relation to fill in gaps in the resultant pulse train on the common medium.

As described above, my invention has been applied only to multiplex signalling. It is clear that it may be desirable to select and suppress pulses in a line even though multiple channels are not present. For example, let it be assumed that only one signal channel is to be transmitted selectively between terminals 10 and 12 of Fig. 1, or to one of the branches A, B and C. It is clear that the signals may be selected at branch A, for example, suppressed in that station and a new signal sent on to the next branch B and so on. By providing suitable synchronizing signals at 10, and respective selectors for these signals at stations A, B, C, etc., it is clear that the pulses may be characterized so as to provide connections selectively between 10 and any one of the branch circuits. These branch circuits could then communicate further by the system of suppression and remodulation, as outlined above.

It is clear that while this system is best adapted for communications carried over lines, the principles of my invention may be applied to radio transmission. In this case, the carrier frequencies such as F1, F2 may be radiated from antennas instead of being transmitted over the separate lines.

While I have described in considerable detail specific embodiments of my invention, this description is to be considered merely as illustrative of the invention and not as a limitation on the scope thereof, as set forth in the objects of my invention and the accompanying claims.

What is claimed is:

1. In a communication system comprising a first terminal for transmitting a plurality of pulse trains, the pulses of each train being timed with respect to those of the other trains to provide a resultant train of pulses, a second terminal for receiving the pulse trains from said first terminal and a common medium interconnecting said terminals, a plurality of branch terminals, each coupled with said medium and comprising means for selecting the pulses corresponding to a different one of said trains, means at each branch for suppressing the selected pulses leaving corresponding gaps in said resultant train, means at the branch terminals for producing other pulses, means for timing said produced other pulses to correspond in time with said selected pulses, and means for applying said produced timed pulses to said common medium where the branches are coupled thereto and in said gaps left by suppression of said selected pulses.

2. A communication system including a single pulse-transmitting circuit, a plurality of stations effectively connected at points on said circuit, means for applying to said circuit regularly-recurring synchronizing pulses, each of said stations having assigned thereto a predetermined period in the intervals between said pulses, said period having a predetermined time relation to said pulses, and said relation being different for each of said stations, and means at each station for applying to said circuit modulated signal pulses and for selecting a period for the occurrence of said signal pulses corresponding to the period assigned to the station to which said signal pulses are to be transmitted, each station being adapted to detect said signal pulses during the period assigned thereto only.

3. A communication system including a plurality of stations, a single pulse-transmitting circuit connecting said stations, means for applying regularly-recurring synchronizing pulses to said circuit, each of said stations being adapted to detect modulated signal pulses applied to said circuit and occurring during a predetermined period only, said period having a predetermined time relation to said synchronizing pulses and said relation being different for each of said stations, and means at each station for applying to said circuit modulated signal pulses capable of being detected by another of said stations as aforesaid, and for selecting the period during which said signal pulses occur.

4. A communication system including a plurality of stations, cables connected to each of said stations and connecting said station to the preceding and succeeding stations respectively, means for applying regularly recurring synchronizing pulses to the circuit constituted by said stations and said cables, each of said stations being adapted to detect modulated signal pulses applied to said circuit and occurring during a predetermined period only, said period having a predetermined time relation to said synchronizing pulses and said relation being different for each of said stations, and means at each station for applying to said circuit modulated signal pulses capable of being detected by another of said stations as aforesaid, and for selecting the period during which said signal pulses occur.

5. A communication system including a single pulse-transmitting circuit, a plurality of stations effectively connected at points on said circuit, means for applying to said circuit regularly-recurring synchronizing pulses, each of said stations having assigned thereto a predetermined period in the intervals between said pulses, said period having a predetermined time relation to said pulses, and said relation being different for each station of the system, means at each station for generating signal pulses, for selecting periods for the occurrence of said pulses corresponding to the periods assigned to the other stations of the system, for modulating said signal pulses and for applying said signal pulses to said circuit, each of said stations including at least two channels, means at each station for diverting synchronizing pulses applied thereto to one of said channels and signal pulses applied thereto to another of said channels, and means in the second of said channels for detecting signal pulses diverted thereto and occurring during the period assigned to the station in which said detecting means are located.

6. A multiplex communication system of the type in which messages are transmitted in separate channels by pulses of separate trains of pulses, each train of a given cadence frequency, in accordance with signal modulations, comprising a first terminal for transmitting said pulse trains, a second terminal for receiving said pulse trains, a common medium interconnecting said first and second terminals, a branch terminal intermediate said first and second terminals coupled to said common medium, means at said branch terminal for selecting and demodulating the pulses corresponding to a given channel, means at said branch terminal for preventing access of the pulses corresponding to the selected given channel to said second terminal, means at said first terminal for giving to the pulses of said channel to be selected a predetermined modulation characteristic, and means at said branch terminal responsive to said predetermined modulation for selecting said pulses of predetermined modulation.

7. A multiplex communication system of the type in which messages are transmitted in separate channels by pulses of separate trains of pulses, each train of a given cadence frequency, in accordance with signal modulations, comprising a first terminal for transmitting said pulse trains, a second terminal for receiving said pulse trains, a common medium interconnecting said first and second terminals, a branch terminal intermediate said first and second terminals coupled to said common medium, means at said branch terminal for selecting and demodulating the pulses corresponding to a given channel, means at said branch terminal for preventing access of the pulses corresponding to the selected given channel to said second terminal, a source of synchronizing signals at said first terminal, means for selectively applying said synchronizing signals to one of said channels to produce a predetermined modulation thereof, and means at said branch terminal responsive to said predetermined modulation for selecting said one of said channels.

8. A multiplex communication system of the type in which messages are transmitted in separate channels by pulses of separate trains of pulses, each train of a given cadence frequency, in accordance with signal modulations, comprising a first terminal for transmitting said pulse trains, a second terminal for receiving said pulse trains, a common medium interconnecting said first and second terminal, a branch terminal intermediate said first and second terminals coupled to said common medium, means at said branch terminal for selecting and demodulating the pulses corresponding to a given channel, means at said branch terminal for preventing access of the pulses corresponding to the selected given channel to said second terminal, a source of synchronizing signals at said first terminal, means for selectively applying said synchronizing signals to one of said channels to produce a predetermined modulation thereof, and means at said branch terminal responsive to said predetermined modulation for selecting said one of said channels, means at said branch terminal for producing a further train of pulses, timing means for timing said produced pulses to correspond in time with said selected pulses, and means to apply said produced timed pulses to said common medium where the branch terminal is coupled thereto.

9. A communication system of the type in which messages are transmitted by time displacement of pulses of a given cadence frequency, in accordance with signal modulations, comprising a first terminal for transmitting said pulses, a second terminal for receiving said pulses, a common medium interconnecting said first and second terminals, a branch terminal intermediate said first and second terminals coupled to said common medium, means at said branch terminal for selecting and demodulating pulses, means at said branch terminal controllable from one of said first and second terminals for suppressing the selected pulses, means at said first terminal for giving to said pulses a predetermined modulation characteristic, and means at said branch terminal responsive to said predetermined modulation for selecting said pulses of predetermined modulation.

10. A communication system comprising a first terminal, means for transmitting from said first terminal a plurality of trains of pulses, means for timing the pulses of each said trains with respect to the pulses of the other trains to provide a resultant train of spaced pulses, a second terminal station for receiving said trains of pulses, a common medium interconnecting said terminals, at least one branch terminal intermediate said first and second terminals coupled to said common medium, means at said branch terminal for producing other trains of pulses, means at said branch terminal for applying said produced train of pulses to said common medium where the branch terminal is coupled thereto in such timed relation with said resultant train of pulses that said produced pulses are interleaved in said resultant train, means at said first terminal for applying a synchronizing modulation to one of said pulse trains, means at said branch terminal for selecting said modulated pulse trains in response to said synchronizing modulations, means at said branch terminal for suppressing said selected modulated pulse train, and means for timing said produced train of pulses to correspond in time with said selected train of pulses, whereby said suppressed train of pulses is replaced by said produced train of pulses.

11. In a communication system having a first terminal for transmitting a plurality of pulse trains, each train comprising a communication channel, the pulses of each train being timed with respect to the others to provide a resultant train of pulses, a second terminal for receiving the pulse trains, and a common transmission medium interconnecting said terminals, an intermediate branch terminal coupled with said medium for selecting one of said channels and supplying a new channel to replace the selected channel comprising selector means for selecting the pulses of a train corresponding to said one channel, suppressor means for suppressing the pulses corresponding to said selected channel at the branch terminal leaving gaps in said resultant wave train, means at the branch terminal for producing a train of pulses corresponding with the pulses of said one channel, timing means for timing the produced train of pulses to correspond with the selected pulse train, means for applying said produced timed pulses to said common medium where the intermediate branch terminal is coupled thereto to supply a new channel replacing said selected channel, means at said first terminal for applying a predetermined modulation to the pulses of one of said trains to provide a synchronizing channel, and means at said branch terminal responsive to said synchronizing channel for causing said selector means to select the pulses defining said one channel.

12. In a communication system, a plurality of terminals, a medium for intercoupling said terminals, means for transmitting time multiplexed pulses over the medium in a plurality of channels, control means at one of said two terminals for providing denial of access to another of said terminals of at least one preselected channel of said plurality of channels, said control means comprising means for modulating pulses of said preselected channel with identifying signals.

DONALD D. GRIEG.

REFERENCES CITED

The following references are of record in the file of this patent:

UNITED STATES PATENTS

| Number | Name | Date |
|---|---|---|
| 913,521 | Latour | Feb. 23, 1909 |
| 1,573,959 | Williams, Jr. | Feb. 23, 1926 |
| 1,655,520 | Smythe | Jan. 10, 1928 |
| 2,016,452 | Nyquist | Oct. 8, 1935 |
| 2,048,081 | Riggs | July 21, 1936 |
| 2,064,907 | Green | Dec. 22, 1936 |
| 2,213,941 | Peterson | Sept. 3, 1940 |
| 2,262,838 | Deloraine et al. | Nov. 18, 1941 |

FOREIGN PATENTS

| Number | Country | Date |
|---|---|---|
| 536,963 | Great Britain | June 3, 1941 |